Dec. 25, 1956     K. M. ARMANTROUT     2,775,133
POWER STEERING MECHANISM
Filed March 9, 1953                        4 Sheets-Sheet 1
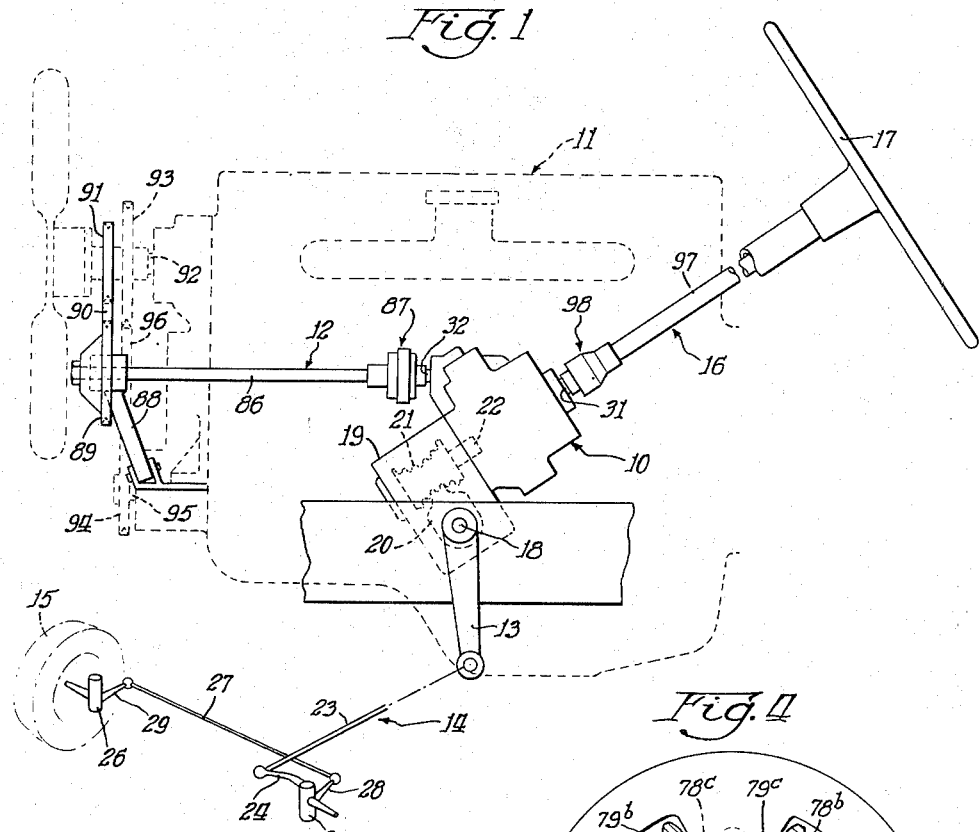
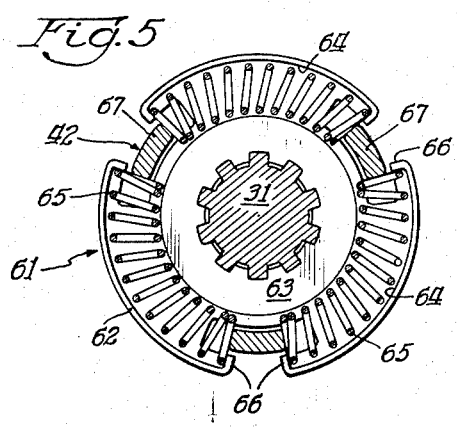
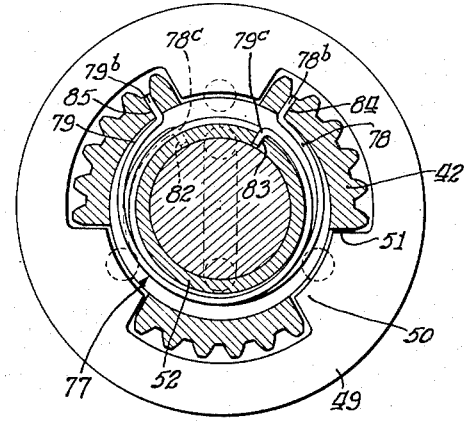
Inventor:
Kenneth M. Armantrout
By: Keith J. Blew Atty.

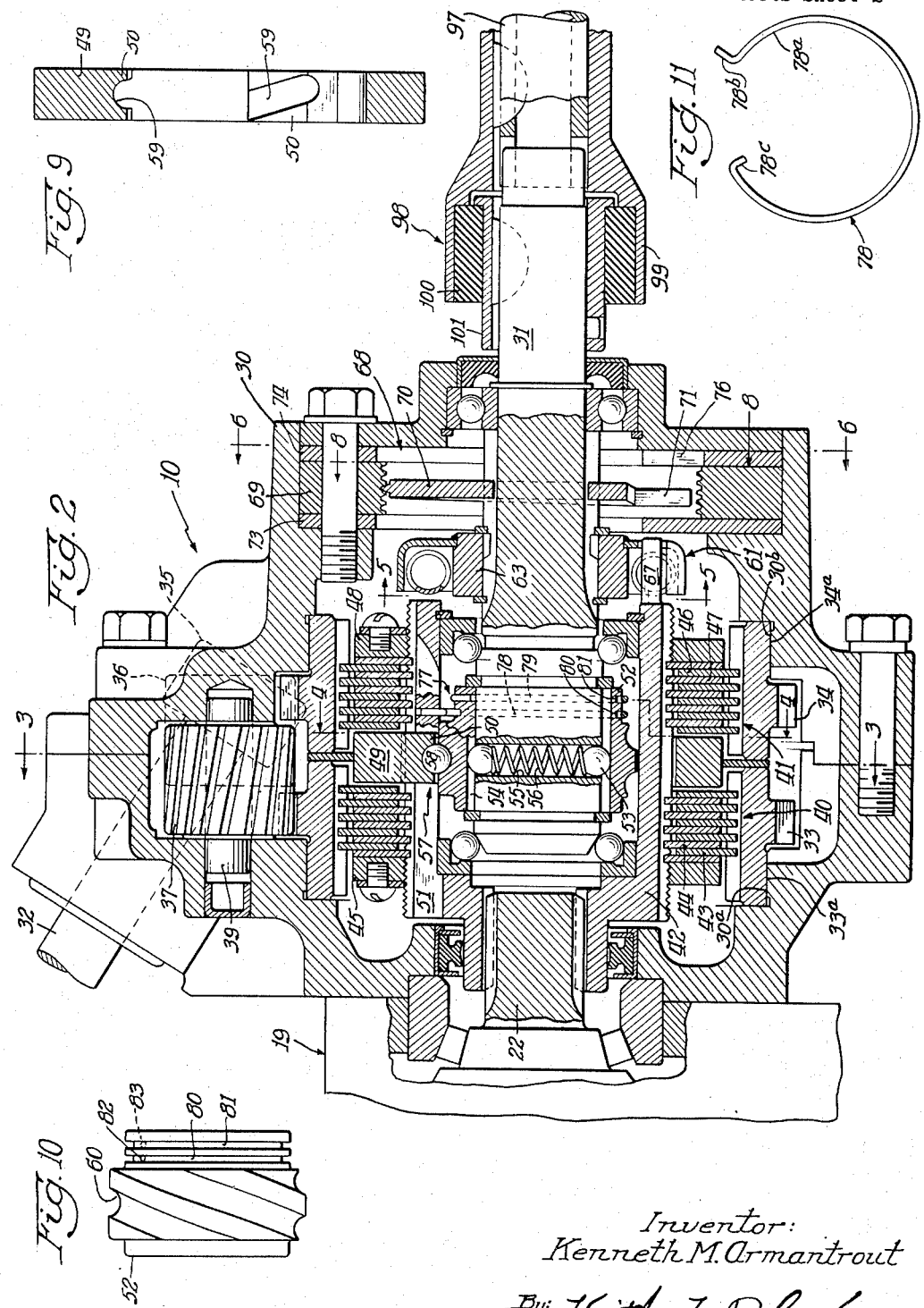

Dec. 25, 1956 K. M. ARMANTROUT 2,775,133
POWER STEERING MECHANISM
Filed March 9, 1953 4 Sheets-Sheet 3
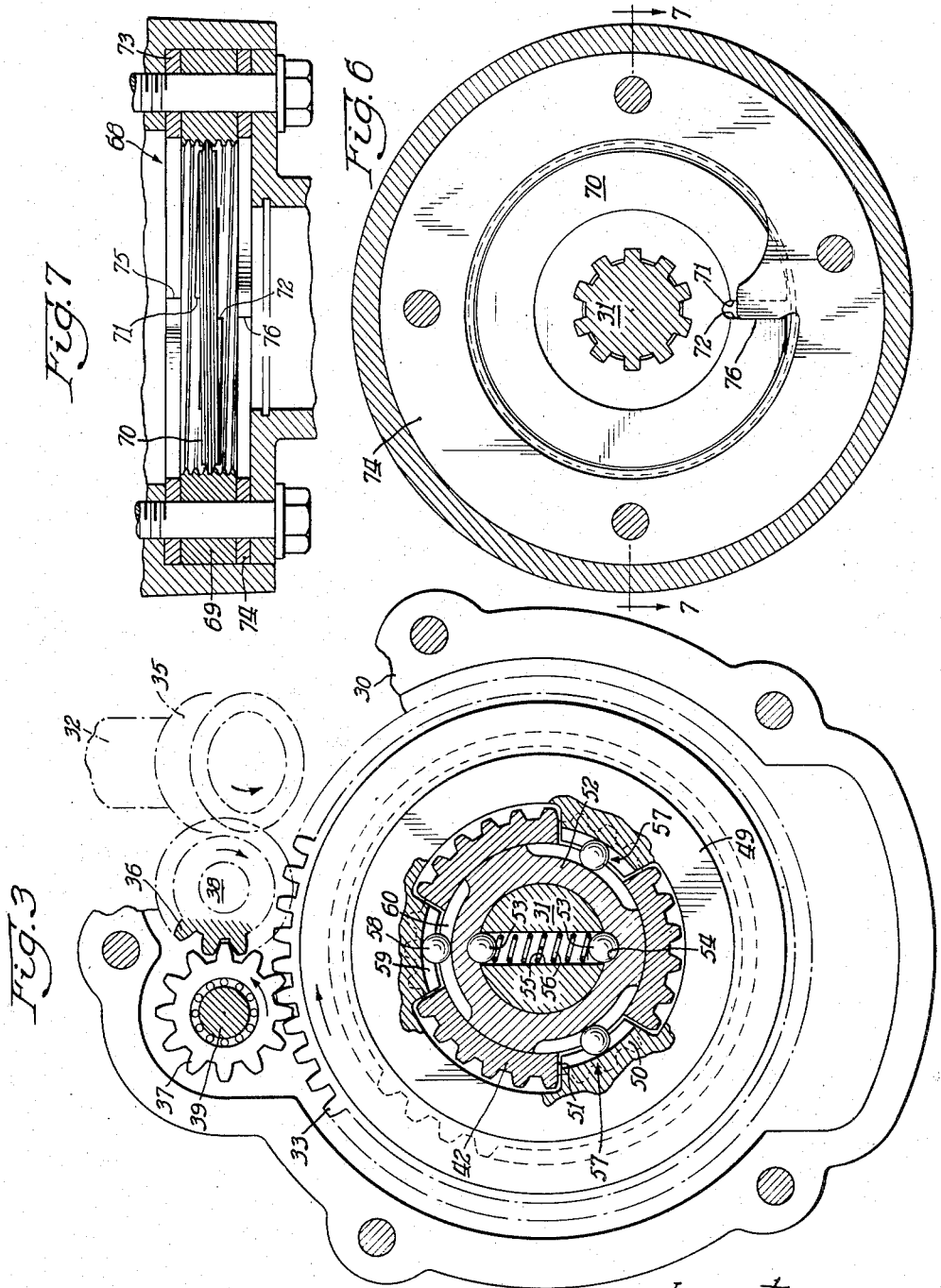
Inventor:
Kenneth M. Armantrout
By: Keith J. Bleuer
Atty Dec. 25, 1956 K. M. ARMANTROUT 2,775,133
POWER STEERING MECHANISM
Filed March 9, 1953 4 Sheets-Sheet 4

Inventor:
Kenneth M. Armantrout
By: Keith J. Blew
atty

United States Patent Office 2,775,133
Patented Dec. 25, 1956

2,775,133

POWER STEERING MECHANISM

Kenneth M. Armantrout, Muncie, Ind., assignor to Borg-Warner Corporation, Chicago, Ill., a corporation of Illinois Application March 9, 1953, Serial No. 341,147

17 Claims. (Cl. 74—388)

My invention relates to power steering mechanisms for automotive vehicles.

A power steering gear unit has been proposed, previous to my invention, comprising a pair of friction clutches driven from the vehicle engine and driving through an output shaft of the steering unit for augmenting the vehicle steering action from the vehicle steering hand wheel for turning the front steerable, dirigible wheels of the vehicle. Each of the clutches is driven from a ring gear journaled within a casing of the unit, and the clutches are engaged by a screw threaded connection between a hub, which is disposed on and is rotated along with a control shaft fixed with respect to the steering hand wheel, and a common clutch pressure plate, which is nonrotatable with respect to the output shaft and is axially moved by the screw threaded connection in one direction or the other to engage one or the other of the clutches, depending upon the direction of turning movement given the steering hand wheel. A resilient connection is provided between the vehicle steering hand wheel and the dirigible vehicle wheels so that the wheels can be steered even though the vehicle engine is inoperative, and a one-way clutch is provided between the ring gears and the vehicle engine for permitting this manual steering with the vehicle engine being inoperative.

It has been found that, with such a unit, one or the other of the ring gears driven from the vehicle engine, having relatively large diameter journals, may possibly seize within the casing rendering the unit inoperative and making it impossible for the dirigible wheels to be moved from the steering hand wheel. It is accordingly an object of my invention to provide an overload release connection between the clutches and the steering hand wheel, and more particularly between the hub and the control shaft, so that if one or the other of the ring gears seizes within the casing, the overload release connection may disconnect and allow the dirigible vehicle wheels to be turned from the steering hand wheel under manual effort through the resilient connection. With this overload release connection, the one-way clutch between the ring gears and the vehicle engine may be dispensed with.

More particularly, it is an object to provide such an overload release connection comprising a spring pressed poppet between the hub and the control shaft turned from the vehicle steering hand wheel, so that, when more than a predetermined force is put on the pressure plate for engaging one or the other of the clutches, the poppet connection will release. It is also an object to provide a spring connection, preferably comprising two oppositely acting springs, between the hub and the output shaft for holding the hub rotatably centered with respect to the output shaft once the poppet releases for holding the common pressure plate in its neutral position in which neither of the clutches is engaged and allowing free movement of the output shaft with respect to the ring gears and the casing, assuming one of the ring gears has seized in the casing.

The invention consists of the novel constructions, arrangements and devices to be hereinafter described and claimed for carrying out above-stated objects and such other objects as will appear from the following description of a certain preferred embodiment of the invention illustrated with reference to the accompanying drawings, wherein:

Fig. 1 is a side elevational view of a power steering mechanism, including a power steering gear unit embodying the principles of the invention;

Fig. 2 is a longitudinal sectional view of the power steering gear unit;

Figure 12:
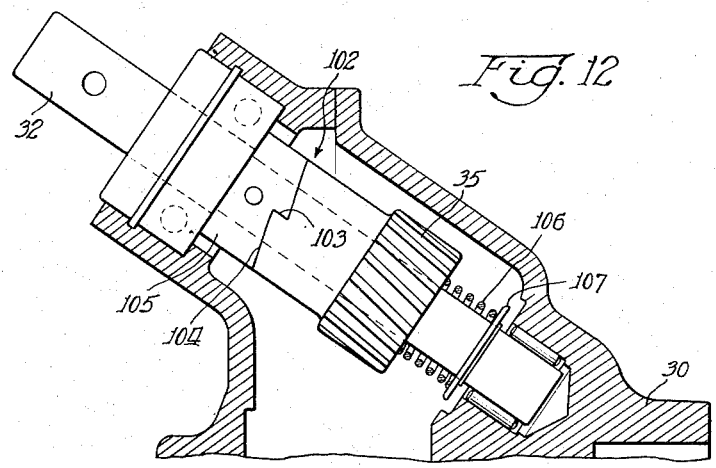
Figure 13:
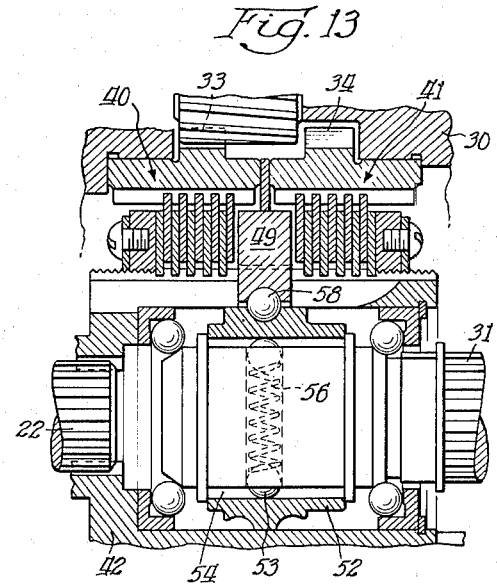
Figure 8:
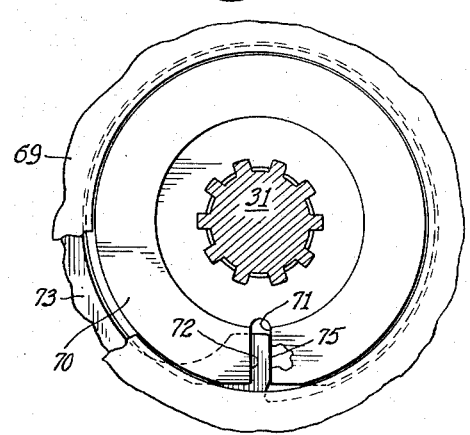

Figs. 3, 4, 5 and 6 are sectional views taken respectively on lines 3—3, 4—4, 5—5 and 6—6 of Fig. 2;

Fig. 7 is a sectional view taken on line 7—7 of Fig. 6 with the control shaft being deleted;

Fig. 8 is a sectional view taken on line 8—8 of Fig. 2;

Fig. 9 is a transverse sectional view of the common clutch pressure plate;

Fig. 10 is a side elevational view of the hub for the common clutch pressure plate;

Fig. 11 is a side elevational view of one of the pair of springs connecting the hub and the output shaft;

Fig. 12 is a sectional view of a portion of a power steering gear unit constituting a modification of the invention; and Fig. 13 is a partial sectional view of a power steering gear unit constituting another modification of the invention.

Like characters of reference designate like parts in the several views.

Referring now to Fig. 1 in particular, the illustrated power steering mechanism comprises a power steering gear unit 10 receiving power from the vehicle engine 11 through power shafting 12 and having a pitman arm 13 connected by the usual linkage 14 with the front steering, dirigible wheels 15 of the vehicle, and connecting shafting 16 between the unit 10 and the usual steering hand wheel 17 of the vehicle.

The pitman arm 13 is secured onto a shaft 18 swingably mounted in a casing 19. A toothed sector 20 is fixed onto the shaft 18 and is in mesh with a worm 21 fixed on a shaft 22. The pitman arm 13 is connected by means of a steering gear connecting rod 23 with a steering knuckle gear rod arm 24 fixed on the left steering knuckle 25 which is pivotally mounted and supports the left steering wheel 15 of the vehicle. The left steering knuckle 25 is connected with the right steering knuckle 26, which is pivotally mounted and supports the right steering wheel 15, by means of a tie rod 27 and knuckle arms 28 and 29 formed respectively on the knuckles 25 and 26.

The steering gear unit 10, which is for the purpose of swinging the arm 13 under the control of the vehicle operator by power from the engine 11, comprises a casing 30 having an input or control shaft 31 and the worm shaft 22 journaled therein in axial alignment. A power input shaft 32 is also journaled within the casing 30 and extends at a skew angle with respect to the shafts 31 and 22. Two ring gears 33 and 34 are journaled within the casing 30 with cylindrical peripheral portions 33a and 34a on the ring gears being in bearing contact with internal cylindrical surfaces 30a and 30b formed within the casing 30. The ring gears 33 and 34 are driven in opposite directions from the shaft 32, and the mechanism for so driving the ring gears includes a gear 35 fixed on the shaft 32 in mesh with a gear 36 and a gear 37 in mesh with the gear 36. The gear 36 is also in mesh with the ring gear 34, and the gear 37 is also in mesh with the ring gear 33, so that upon rotation of the gear 35, the ring gears 33 and 34 will be driven in opposite directions. The gears 36 and 37 are rotatably disposed within the casing 30 by means of shafts 38 and 39, respectively, on which the gears are mounted.

A friction clutch 40 is provided for connecting the ring gear 33 with the output shaft 22, and a friction clutch 41 is provided for connecting the ring gear 34 with the shaft 22. A clutch hub 42 is splined onto the shaft 22. The friction clutch 40 comprises a plurality of clutch discs 43 splined within the ring gear 33 and a plurality of clutch discs 44 splined onto the clutch hub 42. The clutch discs 43 and 44 are alternately stacked, and a pressure plate 45 is fixed to the clutch hub 42 at one end of the stacked discs 43 and 44. The clutch 41 is similar to the clutch 40 except that it is reversely arranged and comprises stacked clutch discs 46 and 47. The discs 46 are splined within the ring gear 34, and the discs 47 are splined onto the clutch hub 42. A pressure plate 48 is fixed onto the clutch hub 42 at one end of the stacked discs 46 and 47.

An axially movable pressure plate 49 is disposed between the clutches 40 and 41 and is splined with respect to the clutch hub 42 by means of inwardly extending projections 50 formed on the pressure plate 49 extending through slots 51 formed in the clutch hub 42. A hub 52 is provided on the shaft 31 for the pressure plate 49. The hub 52 is rotatable on the shaft 31 but is yieldably held fixed against rotation on this shaft by means of detent balls 53 fitting within internal slots 54 in the hub 52 and slidably disposed in a cylindrical cavity 55 extending transversely through the shaft 31. A compression spring 56 is provided in the cavity 55 for yieldably holding the balls 53 in the slots 54.

A screw threaded connection 57 is provided between the hub 52 and the pressure plate 49. The connection 57 comprises a plurality of balls 58 disposed in helical grooves 59 formed within the inwardly extending projections 50 of the pressure plate 49 and disposed also within helical grooves 60 formed on the outer periphery of the hub 52. The grooves 59 and 60 both constitute left hand threads, with the balls 58 forming a connection between the threads, so that when the shaft 31 is rotated in one direction without similar rotation of the pressure plate 49 and the clutch hub 42, the pressure plate 49 will be moved in one direction out of its illustrated neutral position, and the pressure plate 49 will be returned to its original position when the clutch hub 42 returns to its original rotative position with respect to the shaft 31.

A spring connection 61 is provided between the shaft 31 and the shaft 22 through the clutch hub 42. The spring connection 61 comprises a sheet metal spring retainer 62 fixed onto a hub 63 which is splined to the shaft 31. The retainer 62 has a plurality of recesses 64 for retaining springs 65 therein. The recesses 64 are formed by inwardly bent peripheral portions 66 of the spring retainer. The clutch hub 42 is provided with axially extending lug portions 67 which extend between the springs 65 whereby any turning movement of the shaft 31 is yieldably transmitted by spring force through the spring retainer 62, the springs 65, the lug portions 67 and the remainder of the clutch hub 42 to the shaft 22.

A rotation limiting device 68 is provided for the shaft 31 for limiting the amount of turning that may be given to the shaft 31 and thereby to the dirigible wheels of the vehicle. The device 68 comprises an internally threaded annular member 69 and an externally threaded plate 70 splined to the shaft 31. The plate 70 is formed with a right hand thread on its outer periphery which mates with the internal thread in the annular member 69. The plate 70 is provided with abutment faces 71 and 72 on opposite sides, and stop plates 73 and 74 are provided on opposite sides having stop faces 75 and 76, respectively, adapted to cooperate with the faces 71 and 72 respectively. The annular member 69 and stop plates 73 and 74 are fixed in and with respect to the casing 30 as shown.

A spring connection 77 is provided between the hub 52 for the pressure plate 49 and the clutch hub 42 tending to yieldably maintain the hub 52 in a fixed rotative position with respect to the clutch hub 42 corresponding to a neutral disengaged position of the pressure plate 49. The spring connection 77 comprises a pair of springs 78 and 79. The spring 78 as seen in Fig. 11 comprises an arc 78a of spring material having an outwardly extending tang 78b on one end and an inwardly extending tang 78c on the other end. The spring 79 is identical with the spring 78 and has the same parts but is reversely disposed in the assembly. The springs 78 and 79 are respectively disposed in circumferential grooves 80 and 81 provided in the hub 52. The inwardly extending tangs 78c and 79c extend into radial openings 82 and 83 respectively in the hub 52, and the outwardly extending tangs 78b and 79b extend into radial openings 84 and 85 provided in the clutch hub 42.

The driving connection 12 comprises a shaft 86 connected by means of a resilient coupling 87 of any suitable construction with the shaft 32. The shaft 86 is journaled in a bracket 88 fixed with respect to the vehicle engine 11 and has a pulley 89 fixed on the shaft adjacent the bracket. A belt 90 connects the pulley 89 with another pulley 91 fixed on the fan shaft 92 of the engine 11. The fan shaft 92 is driven in accordance with well-known practice by means of a pulley 93 fixed on the shaft 92, a pulley 94 fixed on the crankshaft 95 of the engine 11 and a belt 96 connecting the pulleys 94 and 93.

The connection 16 to the steering hand wheel 17 comprises a shaft 97 on which the steering wheel 17 is mounted and a flexible coupling 98 connecting the shafts 97 and 31. The coupling 98 comprises a shell portion 99 fixed on the end of the shaft 97 and an annular ring 100 of rubber-like material vulcanized or otherwise bonded within the shell portion 99 and to an inner shell 101 which in turn is keyed to the shaft 31.

In operation, the steering hand wheel 17, in accordance with the usual practice, is turned in one direction or the other for the purpose of turning the front dirigible wheels 15 of the vehicle, the wheel 17, from the vehicle driver's standpoint being turned in a clockwise direction for a right turn and in a counterclockwise direction for a left turn. The steering wheel 17 rotates the shaft 97 fixed to the wheel 17, and this turning movement is transmitted through the flexible coupling 98 to the control shaft 31 of the power steering gear 10. If the steering load is light, this movement of the shafts 97 and 31 is transmitted without amplification directly through the spring coupling 61 to the clutch hub 42 and shaft 22 to the dirigible road wheels 15. Steering force from the shaft 22 passes through the worm 21, the toothed sector 20, the pitman arm 13, the steering gear connecting rod 23, the steering knuckle rod arm 24 connected with the knuckle 25 on which one of the dirigible wheels 15 is mounted, the steering knuckle arm 28, the steering knuckle tie rod 27, the steering knuckle arm 29, and the knuckle 26 on which the other dirigible wheel 15 is mounted. The worm 21 and the sector 20 and the connections between the pitman arm 13 and the steering wheels 15 are common and well-known, both in construction and operation, and further details are thus not deemed necessary.

Assuming that there is a relatively heavy steering load, as, for example, when the vehicle is being parked, and the steering wheel 17 is turned clockwise for a right turn, the spring coupling 61 will yield due to the resistance to turning of the shaft 22 connected through the linkage just mentioned with the steering wheels 15. The springs 65 in the coupling 61 in yielding allow the balls 58 to travel within the helical grooves 60 and 59 within the hub 52 and pressure plate 49 due to the relative rotation between the shafts 31 and 22. The balls 58 move the pressure plate 49 to the left as seen in Fig. 2 to thereby engage the friction discs 44 and 43 between the plates 45 and 49 and engage the clutch 40 which is effectively disposed between the ring gear 33 and the clutch hub 42, so that this clutch is effective to drive the clutch hub 42 and thereby the shaft 22 in the same direction as the shaft 31 is rotated by the steering hand wheel 17. As will be noted from Fig. 3, the ring gear 33 is driven in the clockwise direction as seen in the figure, and the ring gear 34 is driven in the counter-clockwise direction, the drive of the ring gears being through the gears 35, 36 and 37, as has been hereinbefore mentioned. The gear 35 is driven through the following parts: the crank shaft 95, the pulley 94, the belt 96, the pulley 93, the fan shaft 92, the pulley 91, the belt 90, the pulley 89, the shaft 86, the flexible coupling 87 and the shaft 32. When the shaft 22 has been rotated by the combined action of the springs 65 and the clutch 40 an amount equal to the rotation given the shaft 31 by the steering hand wheel 17 and assuming the vehicle driver puts no static torque on the hand wheel 17 tending to turn the wheel in one direction or the other, the pressure plate 49 moves to the right as seen in Fig. 2 back into its illustrated neutral position in which both cloutches 40 and 41 are disengaged, this axial movement of the plate 49 being due to the action of the balls 58 travelling in the grooves 59 and 60 due to the rotation of the shaft 22 with respect to the shaft 31.

When the shaft 31 is turned in a counterclockwise direction by the steering hand wheel 17 to steer the vehicle to the left, the clutch 41 in this instance under heavy steering loads is similarly effective to rotate the shaft 22 so that it moves through the same arc in the same direction as the shaft 31. Under light steering loads, the spring coupling 61, as for movement of the steering hand wheel 17 in the other direction, is effective to move the shaft 22 and the connected front dirigible wheels of the vehicle for a left turn of the vehicle. When the steering load is relatively heavy, the rotation of the shaft 31 without a corresponding rotation of the shaft 22 causes the pressure plate 49 to move to the right as seen in Fig. 2 due to the action of the balls 58 moving through the grooves 59 and 60. This movement of the pressure plate 49 engages the clutch 41, and the clutch 41 rotates the clutch hub 42 and the shaft 22 in a counterclockwise direction, that is, in the same direction as the shaft 31 is turned, to rotate the shaft 22 the same amount from its original position as the shaft 31 is rotated. As the shaft 22 approaches the same rotative position as the shaft 31, the balls 58 move through the grooves 59 and 60 and move the pressure plate 49 back to the left into its neutral position in which it is illustrated in Fig. 2 to disengage the clutch 41, assuming the vehicle driver puts no static torque on the hand wheel 17 tending to turn the wheel in one direction or the other.

The limiting mechanism 68 functions to limit the amount of turning movement that can be given the shaft 31 by means of the steering hand wheel 17. The plate 70, which is in threaded engagement with the annular member 69 fixed with respect to the casing 30, travels longitudinally of the member 69 since it is splined onto the shaft 31, as the shaft 31 is rotated. When the direction of rotation of the shaft is in a clockwise direction for a right turn of the vehicle, the plate 70 moves to the left as seen in Fig. 2 until eventually its abutment surface 71 moves against the abutment surface 75 of the stop member 73 and prevents further rotation of the shaft 31 in this direction. The plate 70 functions in a similar manner for a left turn of the vehicle, in which case the plate 70 moves to the right as seen in Fig. 2 until its abutment surface 72 strikes the abutment surface 76 of the stop member 74 and prevents further rotation of the shaft 31 in this direction.

The flexible coupling 98 is effective to dampen any vibrations which might be transmitted from the power steering gear unit 10 to the hand wheel 17, and the resilient coupling 87 allows a limited movement and angle between the shafts 32 and 86.

The spring poppet connection, which comprises the balls 53 and spring 56, between the shaft 31 and the hub 52 and the spring connection 77 constitute a safety mechanism for assuring that, under all conditions, the steering hand wheel 17 is effective for turning the dirigible wheels 15 of the vehicle, even though the vehicle engine 11 is inoperative and even though some mechanical difficulty stopping rotation of the ring gears 33 and 34 takes place within the unit 10. Conceivably, the ring gears 33 and 34 may seize in the casing 30 due to metal chips in the lubricating oil within the casing 30 coming between the journal surfaces 33a, 34a, 30a and 30b. With the gears 33 and 34 stationary, when the shaft 31 is turned with substantial force in either direction, the pressure plate 49 will engage either of the clutches 40 or 41 and pack the plates 43 and 44 or the plates 46 and 47 together, at which time the pressure plate 49 can move no farther axially, and the engaged clutch 40 or 41 will lock the clutch hub 42 and shaft 22 to either of the stationary ring gears 33 or 34 preventing any rotation of this shaft and steering of the vehicle. When the plates 43 and 44 or the plates 46 and 47 are thus packed tightly together for a full engagement of either the clutch 40 or the clutch 41 and the pressure plate 49 can move no farther axially, the balls 53 under the continued application of force to the steering hand wheel 17 move out of their detent slots 54 and allow further rotation of the shaft 31 which will be transmitted through the spring connection 61 to the clutch hub 42 and the output shaft 22 to turn the dirigible wheels 15 by manual effort.

The spring connection 77 between the hubs 52 and 42 functions, once the detent balls 53 have moved out of the slots 54 to thus rotatively free the hub 52 with respect to the shaft 31, to rotatively center the hub 52 with respect to the clutch hub 42 and thereby move the balls 58 within the particular parts of the grooves 59 and 60 in which the pressure plate 49 is disposed in its axially neutral position in which it is illustrated in Fig. 2 and in which both the clutches 40 and 41 are disengaged. The spring 79 in particular tends to rotate the hub 52 back into its neutral position from one side thereof and the spring 78 in particular acts oppositely to move the hub 52 back into its neutral position from the other side of the neutral position. The spring connection 77 therefore assures that both of the clutches 40 and 41 will be completely disengaged under these conditions.

The embodiment of the invention illustrated in Fig. 12 is the same as has been previously described except that a one-way clutch 102 is effectively disposed between the gear 35 and the shaft 32. In this embodiment, the gear 35 is rotatably disposed on the shaft 32, and the gear is provided with axially extending abutment faces 103 on opposite sides thereof connected by spirally cut end portions 104. A collar 105 is fixed onto the shaft 32, and the collar 105 is provided with similar abutment faces 103 mating with the faces 103 on the gear 35 and similar spirally cut end faces 104 mating with the end faces 104 formed on the gear 35. A compression spring 106 is provided between the gear 35 and a ring 107 fixed on the shaft 32.

The one-way clutch 102 disengages when there is a tendency for the gear 35 to rotate in the direction it is driven from the shaft 32 when the shaft 32 is stationary due to the vehicle engine 11 being inoperative. Under this condition of the vehicle engine, the driven shaft 22 may be rotated in one direction or the other through the spring connection 61 and through either of the clutches 40 or 41 from the shafts 97 and 31. The pressure plate 49 is moved to engage one or the other of the clutches 40 and 41, as previously described, and turning movement will be transmitted through the clutch plates 43 and 44 or 46 and 47 to the clutch hub 42 and the shaft 22, and the corresponding ring gear 33 or 34 will rotate along with the plates of the clutch. This rotation of the ring gears will be permitted by the one-way clutch 102 which will allow the gears 33, 34, 37, 36 and 35 to rotate in the same directions in which they are driven from the shaft 32 when it is driven. The one-way clutch 102 disengages with the slanted end faces 104 of the gear 35 ratcheting over the faces 104 of the collar 105.

The detent mechanism comprising the spring pressed balls 53 fitting in the slots 54 may, as previously described in connection with the other embodiment of the invention, move out of the slots 54 when a force is put on the shaft 31 and the ring gears 33 and 34 are stationary; however, this force is appreciable. Assuming the ring gears 33 and 34 are not seized within the casing 30, driving the shaft 22 and causing the gears 33, 34, 37, 36 and 35 to rotate with the one-way clutch 102 overrunning takes a considerably smaller force on the shaft 31, and it is thus desirable to include the one-way clutch 102 to allow the shaft 22 to be easily moved from the shaft 31 when the engine 11 is inoperative but the ring gears 33 and 34 are not seized within the casing 30 as is normally the case.

Referring to Fig. 13, the modification illustrated in this figure is the same as shown in Fig. 2 and related figures with the exception that the springs 78 and 79 are omitted. The springs 78 and 79, when the detent mechanism comprising the spring pressed balls 53 fitting in the slots 54 opens, do assure that the common pressure plate 49 is in its neutral position; however, I have found that, due to the natural tendency of each of the clutches 40 and 41 to disengage, when there is no force from the hub 52 transmitted through the balls 58 tending to engage the pressure plate 49 with either of the clutches, the clutches 40 and 41 will be substantially disengaged, even though the pressure plate 49 is not in its absolute neutral position.

The detent mechanism comprising the spring pressed balls 53 fitting in the slots 54 in the hub 52 advantageously provides a disconnection between the control shaft 31 and the clutches 40 and 41 if the ring gears 33 and 34 seize within the casing 30, so that the shaft 22 and the dirigible wheels 15 can be moved under manual force directly from the hand wheel 17. An excessive manual force on the wheel 17 is required under these conditions, since the clutches 40 and 41 are not available to manually provide a part of the power for moving the shaft 22 from the engine 11 and since the balls 53 under spring action must be moved out of the slots 54, and the detent comprising the balls 53 acts as an overload release connection in order to make it possible to steer the vehicle from the wheel 17 under these emergency conditions which could otherwise result in disaster to both the vehicle and the driver. The spring connection 77 between the hubs 52 and 42 assures that once the detent connection between the hub 52 and the shaft 31 is broken, the hub 52 will be in a neutral rotative position with respect to the hub 42 maintaining the common pressure plate 49 for the clutches 40 and 41 in a neutral clutch disengaged position, so that the output shaft 22 of the steering unit 10 is not restrained in its rotation by connection through either of the clutches 40 or 41 with the stationary ring gears 33 and 34, allowing free movement of the shaft 22 and steering movement of the dirigible wheels 15 from the shaft 31, once the detent connection has been broken from the shaft 31 to the hub 52 for the pressure plate 49.

I wish it to be understood that my invention is not to be limited to the specific constructions and arrangements shown and described, except only in-so-far as the claims may be so limited, as it will be understood to those skilled in the art that changes may be made without departing from the principles of the invention.

I claim:

1. In steering mechanism for motor vehicles, a steering shaft adapted to be manually operated by means of a steering hand wheel, an output shaft adapted for connection with the steering ground wheels of the vehicle, power operated mechanism under the control of said steering shaft for driving said output shaft for steering the vehicle, said power operated mechanism having a pair of clutches with a common pressure plate that engages one or the other of said clutches depending on the direction of rotation of said steering shaft, an overload releasing means between said steering shaft and said power operated mechanism for disconnecting said steering shaft with said power operated mechanism when more than a predetermined rotative force is applied to the steering shaft, and means for simultaneously connecting said steering shaft with said output shaft to permit the latter to be turned by manual effort from the steering shaft when said power operated mechanism is inoperative.

2. In steering mechanism for motor vehicles, a steering shaft adapted to be manually operated by means of a steering hand wheel, an output shaft adapted for connection with the steering ground wheels of the vehicle, power operated mechanism under the control of said steering shaft for driving said output shaft for steering the vehicle, said power operated mechanism having a pair of clutches with a common pressure plate that engages one or the other of said clutches depending on the direction of rotation of said steering shaft, a lost motion connection between said two shafts, and an overload releasing means between said steering shaft and said power operated mechanism for disconnecting said steering shaft with said power operated mechanism when said power operated mechanism is inoperative and when a predetermined force is applied to a steering shaft so that said steering shaft may be used to turn said output shaft by manual effort through said lost motion connection.

3. In steering mechanism for motor vehicles, a steering shaft adapted to be manually operated by means of a steering hand wheel, an output shaft adapted for connection with the steering ground wheels of the vehicle, power operated mechanism under the control of said steering shaft for driving said output shaft for steering the vehicle and comprising two clutches for turning the output shaft in opposite directions and a common pressure plate for the clutches controlled to engage the clutches by rotating said steering shaft whereby said pressure plate engages one of said clutches, a lost motion connection between said shafts, and an overload releasing means for disconnecting said steering shaft and said pressure plate when a predetermined force is applied to the steering shaft thereby allowing said output shaft to be rotated through said lost motion connection from said steering shaft when said power operated mechanism is inoperative.

4. In steering mechanism for motor vehicles, a steering shaft adapted to be manually operated by means of a steering hand wheel, an output shaft adapted for connection with the steering ground wheels of the vehicle, power operated mechanism under the control of said steering shaft for driving said output shaft for steering the vehicle, a lost motion connection between said shafts, and an overload release device between said steering shaft and said power operated mechanism for releasing the connection therebetween when more than a predetermined rotative effort is put on said steering shaft, whereby said lost motion connection may then be operative to turn said output shaft from said steering shaft by manual effort.

5. In steering mechanism for motor vehicles, a steering shaft adapted to be manually operated by means of a steering hand wheel, an output shaft adapted for connection with the steering ground wheels of the vehicle, power operated mechanism driven from the vehicle motor and under the control of said steering shaft for driving said output shaft for steering the vehicle, a lost motion connection between said shafts, and a detent mechanism connecting said steering shaft and said power operated mechanism and comprising a spring pressed ball engageable in a slot for releasing when more than a predetermined load is put on said steering shaft to permit the latter to rotate said output shaft by manual effort through said lost motion connection when said power operated mechanism is inoperative.

6. In steering mechanism for motor vehicles, a steering shaft adapted to be manually operated by means of a steering hand wheel, an output shaft adapted for connection with the steering ground wheels of the vehicle, mechanism power operated from the vehicle motor and under the control of said steering shaft for driving said output shaft for steering the vehicle, said power operated mechanism including a pair of clutches and a clutch member for engaging either of the said clutches and having a screw threaded connection with said steering shaft for engaging one or the other of the clutches depending on the direction said steering shaft is rotated, a lost motion connection between said shafts, and an overload release device between said clutch member and said steering shaft for releasing when more than a predetermined load is put on said clutch member for allowing said output shaft to be rotated through said lost motion connection from said steering shaft when said power operated mechanism is inoperative.

7. In steering mechanism for motor vehicles, a steering shaft adapted to be manually operated by means of a steering hand wheel, an output shaft adapted for connection with the steering ground wheels of the vehicle, power operated mechanism driven from the motor of the vehicle and under the control of said steering shaft for driving said output shaft for steering the vehicle, said power operated mechanism including two clutches adapted to be driven from the vehicle motor and to drive said output shaft, a common pressure plate for said clutches and rotatable with said driven shaft, a screw threaded connection between said steering shaft and said pressure plate whereby relative rotation between said shafts causes said pressure plate to engage one or the other of said clutches, a lost motion connection between said shafts, and an overload release device between said screw threaded connection and said steering shaft to permit the steering shaft to turn said output shaft by manual effort through said lost motion connection when said power operated mechanism is inoperative.

8. In steering mechanism for motor vehicles, a steering shaft adapted to be manually operated by means of a steering hand wheel, an output shaft adapted for connection with the steering ground wheels of the vehicle, power operated mechanism adapted to be driven from the vehicle motor and under the control of said steering shaft for driving said output shaft for steering the vehicle, said power operated mechanism including two ring gears adapted to be driven from the vehicle motor, a pair of friction clutches between said ring gears and said output shaft, a common pressure plate for said friction clutches and constrained to rotate with said output shaft, a screw threaded connection between said steering shaft and said pressure plate for causing said pressure plate to move in one direction or the other to engage one or the other of said clutches depending upon relative rotation between said two shafts, a spring pressed detent device between said steering shaft and said screw threaded connection for releasing when more than a predetermined torque is put on said steering shaft with one or the other of said clutches being engaged and said ring gears being stationary, and a lost motion connection between said shafts whereby to permit said output shaft to be turned by manual effort from said steering shaft when said detent device is released.

9. In steering mechanism for motor vehicles, a steering shaft adapted to be manually operated by means of a steering hand wheel, an output shaft adapted for connection with the steering ground wheels of the vehicle, power operated mechanism under the control of said steering shaft for driving said output shaft for steering the vehicle, said power operated mechanism having a pair of clutches with a common pressure plate that engages one or the other of said clutches depending on the direction of rotation of said steering shaft, an overload releasing means between said steering shaft and said power operated mechanism for disconnecting said steering shaft with said power operated mechanism when more than a predetermined rotative force is applied to the steering shaft, means for simultaneously connecting said steering shaft with said output shaft so that the latter can be turned by manual effort from said steering shaft when said power-operated mechanism is inoperative, and means for maintaining said power operated mechanism deactuated when said last named connecting means is operative.

10. In steering mechanism for motor vehicles, a steering shaft adapted to be manually operated by means of a steering hand wheel, an output shaft adapted for connection with the steering ground wheels of the vehicle, power operated mechanism having a pair of clutches with a common control member movable to engage one or the other of said clutches depending on the direction of rotation while being under the control of said steering shaft for driving said output shaft by power for steering the vehicle, an overload releasing means between said power operated mechanism and said steering shaft for disconnecting said control member from said steering shaft when more than a predetermined rotative force is applied to the steering shaft, means for simultaneously connecting said steering shaft with said output shaft so that said steering shaft may be actuated to turn said output shaft by manual effort when said power operated mechanism is inoperative, and means for maintaining said control member in a position neutralizing said power operated mechanism when said manual connection is effective.

11. In steering mechanism for motor vehicles, a steering shaft adapted to be manually operated by means of a steering hand wheel, an output shaft adapted for connection with the steering ground wheels of the vehicle, power operated mechanism having a control member under the control of said steering shaft for driving said output shaft by power for steering the vehicle, a lost motion connection between said shafts, an overload release device between said steering shaft and said control member for releasing the control member when more than a predetermined rotative effort is put on said steering shaft whereupon said lost motion connection may then be operative to turn said output shaft from said steering shaft by manual effort, and resilient means for holding said control member in a neutralizing position maintaining said power operated mechanism deactuated when said overload release device has disconnected said steering shaft and said control member.

12. In steering mechanism for motor vehicles, a steering shaft adapted to be manually operated by means of a steering hand wheel an output shaft adapted for connection with the steering ground wheels of the vehicle, power operated mechanism for driving said output shaft for steering the vehicle and comprising a pair of clutches having a common control member movable to engage one or the other of the clutches in response to rotation of said steering shaft, a lost motion connection between said shafts, an overload release device between said steering shaft and said control member for releasing when more than a predetermined rotative effort is put on said steering shaft whereby lost motion connection may be operative to turn said output shaft from said steering shaft by manual control effort, and resilient means for maintaining said control member in a clutch neutralizing position once said overload release device has released.

13. In steering mechanism for motor vehicles, a steering shaft adapted to be manually operated by means of a steering hand wheel, an output shaft adapted for connection with the steering ground wheels of the vehicle, power operated mechanism for driving said output shaft for steering the vehicle and comprising two ring gears rotatively mounted in a casing and each connected by a friction clutch with said output shaft and a control member movable by rotation of said steering shaft to engage one or the other of said clutches, a lost motion connection between said shafts, an overload release device between said steering shaft and said control member whereby said lost motion connection may be operative to turn said output shaft by manual effort when said overload release device releases when said ring gears are stationary, and resilient means for maintaining said control member in a clutch neutralizing position once said overload release device has released.

14. In steering mechanism for motor vehicles, a steering shaft adapted to be manually operated by means of a steering hand wheel, an output shaft adapted for connection with the steering ground wheels of the vehicle, power operated mechanism including two friction clutches for driving said output shaft in one direction or the other for steering the vehicle, a common pressure plate rotative with said output shaft for engaging one or the other of said clutches, a hub rotative with said steering shaft, a screw threaded connection between said hub and said pressure plate whereby the pressure plate is movable out of a neutral position to engage one or the other of said clutches when said steering shaft is turned with respect to said output shaft, a lost motion connection between said shafts, an overload release device between said hub and said steering shaft for permitting said output shaft to be turned by manual effort from said steering shaft when said release device releases, and resilient means effectively between said output shaft and said hub for maintaining said hub in a clutch neutralizing position when said overload release device has released.

15. In steering mechanism for motor vehicles, a steering shaft adapted to be manually operated by means of a steering hand wheel, an output shaft adapted for connection with the steering ground wheels of the vehicle, power operated mechanism for driving said output shaft for steering the vehicle and comprising two friction clutches alternately engageable for driving the output shaft in opposite directions, a common pressure plate for said clutches rotative with said output shaft, a hub on said steering shaft, a poppet device constituting an overload release device connecting the hub with said steering shaft for turning the hub, a screw threaded connection between said hub and said pressure plate whereby the pressure plate is moved in one direction or the other to engage one or the other of said clutches when said steering shaft is rotated relative to said output shaft, a lost motion connection between said shafts whereby said output shaft may be turned by manual effort from said steering shaft when said power operated mechanism is inoperative and said overload release device has released, and a pair of springs effectively between said hub and said output shaft for maintaining said hub and thereby said common pressure plate in clutch neutralizing positions when said overload release device has released.

16. In steering mechanism for motor vehicles, a steering shaft adapted to be manually operated by means of a steering hand wheel, an output shaft adapted for connection with the steering ground wheels of the vehicle, power operated mechanism under the control of said steering shaft for driving said output shaft for steering the vehicle, said power operated mechanism including a pair of ring gears each driving a clutch and a clutch member for engaging either of the clutches and having a screw threaded connection with said steering shaft for engaging one or the other of the clutches depending on the direction said steering shaft is rotated, a driving connection for driving said ring gears in opposite directions and adapted to be connected with the motor of the vehicle, a lost motion connection between said shafts, and an overload release device between said clutch member and said steering shaft for releasing when more than a predetermined load is put on said clutch member for allowing said output shaft to be rotated through said lost motion connection from said steering shaft when said ring gears are held stationary, said driving connection between the vehicle motor and the ring gears including a one-way clutch which releases when said steering shaft is utilized for turning said output shaft when the motor of the vehicle is inoperative.

17. In steering mechanism for motor vehicles, a steering shaft adapted to be manually operated by means of a steering hand wheel, an output shaft adapted for connection with the steering ground wheels of the vehicle, power operated mechanism under the control of said steering shaft for driving said output shaft for steering the vehicle, said power operated mechanism including two ring gears each adapted to drive a clutch and drive means for connecting the ring gears to be driven in opposite directions from the motor of the vehicle, a common pressure plate for said clutches and rotatable with said driven shaft, a screw threaded connection between said steering shaft and said pressure plate whereby relative rotation between said shafts causes said pressure plate to engage one or the other of said clutches, a lost motion connection between said shafts, and a spring pressed detent device between said steering shaft and said screw threaded connection for releasing when more than a predetermined torque is put on said steering shaft with one or the other of said clutches being engaged and said ring gears being stationary and allowing said output shaft to be turned through said lost motion connection, said drive means to said ring gears including a freely releasable one-way clutch which allows said ring gears and said output shaft to be turned through said clutches and said detent device when the motor of the vehicle is inoperative.

References Cited in the file of this patent
UNITED STATES PATENTS

| | | |
|---|---|---|
| 2,311,010 | Vickers | Feb. 16, 1943 |
| 2,553,795 | Staude | May 22, 1951 |